UNITED STATES PATENT OFFICE

2,340,072

SOLUTION OF WATER-SOLUBLE CELLULOSE ETHERS

Robert C. Medl, Jr., Marshallton, Del., assignor to Hercules Powder Company, Wilmington, Del., a corporation of Delaware No Drawing. Application June 15, 1942,
Serial No. 447,177

11 Claims. (Cl. 106—194)

This invention relates to coating compositions and more particularly to aqueous coating compositions comprising water-soluble cellulose ethers as essential ingredients.

Water-soluble cellulose ethers form aqueous coating compositions suitable for depositing oil-proof coatings. They also serve as bases for water paints and adhesive coating compositions. However, these compositions are limited in use by their tendency to stain in the presence of ferrous surfaces. Thus, where they come in contact with iron in use or where they are handled in iron equipment, the coating compositions themselves or films deposited therefrom become brown or spotted with brown, or fail altogether at rust spots.

Now in accordance with this invention the staining tendencies of water solutions of water-soluble cellulose ethers are overcome by incorporating in the solutions small quantities of water-soluble, non-acid salts of phosphoric, boric and other polybasic acids. The phosphate and borate salts are used in a quantity which is sufficient to prevent the formation of brown spots when the coating composition is placed on a clean iron or black iron surface, but will be insufficient in quantity to interfere with the usefulness of the film resulting upon drying of the composition.

Compositions in accordance with this invention are illustrated in the specific examples of the accompanying table.

smooth at 2° C. to form a base solution. The proportions were 3 parts of cellulose ether per 100 parts of water for the medium viscosity methyl cellulose and 6 parts of cellulose ether per 100 parts of water for the low viscosity ethers. The other ingredients were added to the base solution in the necessary quantities to form the compositions of the examples.

It will be appreciated that all compositions were not equally resistant to staining by iron. Thus, the compositions of Examples 1, 5, and 8 gave coatings free of rust spots when coated upon black iron sheet, but did not entirely prevent rust spots when coated upon freshly scratched iron; compositions of Examples 2, 3, 4, 6, 7, and 9 gave rust-free coatings on black iron sheet and on freshly scratched iron sheet. Compositions in which a simple salt is in excess of 10–12% of non-volatile contents usually deposit white films, a portion of the salt behaving as a pigment. Smaller proportions give clear films. The presence of plasticizers such as glycerine in general increases the quantity of salt required to whiten a film. Excess salt in moderate quantity has little effect upon the properties of the film but in some cases may decrease adhesion. Inclusion of casein in soluble form, such as sodium caseinate, in a quantity of 5–50% by weight of the cellulose ether, greatly increases adhesion of the coating film.

It has been found that the non-acid salts of

|  | Example |  |  |  |  |  |  |  |  |  |  |  |  |  |  |  |  |  |  |  |
|---|---|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 | 17 | 18 | 19 | 20 |
| Methyl cellulose (medium viscosity) | 2 | 2 | 2 | 2 | 2 | 2 | 2 | 2 | 2 | 2 |  |  |  |  |  |  |  |  |  |  |
| Methyl cellulose (low viscosity) |  |  |  |  |  |  |  |  |  |  | 4 | 4 | 4 |  |  | 3 | 5 | 7 | 5 | 3 |
| Cellulose ether of sodium glycollate |  |  |  |  |  |  |  |  |  |  |  |  |  | 3 | 4 |  |  |  |  |  |
| Glycerine |  |  |  |  |  |  |  |  |  |  | 1 | 1.5 | 1 | 0.5 | 0.5 |  |  | 1 |  | 0.5 |
| Dextrose |  |  |  |  |  |  |  |  |  |  |  | 1.5 |  |  |  |  |  |  |  |  |
| Sodium caseinate |  |  |  |  |  |  |  |  |  |  |  |  | 1.3 | 0.3 | 0.5 | 1 |  |  |  | 1 |
| Hide glue |  |  |  |  |  |  |  |  |  |  |  | 0.5 |  |  |  |  |  |  |  |  |
| Trisodium phosphate | 0.1 | 0.2 | 0.3 | 1.0 |  |  |  |  |  |  | 0.4 | 0.5 | 0.2 | 0.4 |  |  |  |  |  |  |
| Tripotassium phosphate |  |  |  |  |  |  |  |  |  | 0.3 |  |  |  |  |  |  |  |  |  |  |
| Sodium tetraborate |  |  |  |  | 0.3 | 0.5 | 1.0 |  |  |  |  |  | 0.3 |  |  |  |  |  |  |  |
| Sodium silicate |  |  |  |  |  |  |  | 0.5 | 1 |  |  |  |  |  |  |  |  |  |  |  |
| Sodium borophosphate ("Abopon") |  |  |  |  |  |  |  |  |  |  |  |  |  |  |  | 2 | 1 | 2.5 | 5 |  |
| Sodium borophosphate (Stacol) |  |  |  |  |  |  |  |  |  |  |  |  |  |  |  |  |  |  | 2.5 | 1 |
| Water | 97.9 | 97.8 | 97.7 | 97.0 | 97.7 | 97.5 | 97.0 | 97.5 | 97 | 87.7 | 79.6 | 92.0 | 93.2 | 95.8 | 93.0 | 95 | 92.5 | 87 | 92.5 | 94.5 |
| Ethyl alcohol |  |  |  |  |  |  |  |  |  | 10 | 15 |  |  |  |  |  |  |  |  |  |

NOTES.—All parts are by weight. Salt quantities are in all cases on the basis of the anhydrous form. The cellulose ethers are all of the water-soluble type.

The compositions of the examples were prepared by stirring the cellulose ether into water at 70° C., chilling to 2° C., and stirring until phosporic acid and boric acid soluble in water to an extent of 0.2 g. per 100 g. of water are most effective to prevent staining upon contact of the water-soluble cellulose ether coating composition with ferrous surfaces, and in addition they are cheap, non-toxic, and of least effect on film properties. Thus, for example, such salts as sodium phosphate, lithium phosphate, potassium phosphate, sodium tetraborate, potassium tetraborate, lithium tetraborate, magnesium orthoborate are preferably utilized. These give an alkaline reaction in water. However, similarly water-soluble salts of polybasic acids generally are suitable in those cases in which the salts give an alkaline reaction in water, for example, sodium silicate, potassium silicate, sodium arsenite, potassium arsenite, magnesium orthoarsenite, sodium arsenate, potassium tetrasilicate, sodium tartrate, potassium citrate, lithium citrate, and the like.

Complex sodium borophosphates such as those sold under the trade names "Abopon" and "Stacol" have been found good anti-staining ingredients. These substances are compatible with water-soluble cellulose ethers in a very much higher proportion than simple salts and hence do not affect film clarity in any practical proportion. They also act as plasticizers. They may be used in quantities as high as the quantity of cellulose ether present and preferably are used in a quantity of 10–40% by weight of the cellulose ether. Any stable, water-soluble borophosphate may be used alternatively, alkali metal borophosphates, such as the sodium, lithium and potassium salts, being preferred.

It is necessary to use only a sufficient quantity of the phosphate, borate or other salt to prevent the cellulose ether water solution from forming rust spots when the solution is painted upon a clean iron surface or upon a sheet of black iron. Usually, it will be desirable to include at least 0.1% by weight of the water solution. Preferably the quantity is 0.3–0.6% of the solution. As much as 5% of the solution has been utilized successfully although for simple salts it is desirable for good film structure to use no more than about 2% of the solution. The quantity utilized should not be so large as to cause embrittlement of the film.

It will be noted from the examples that the coating compositions in accordance with this invention may consist of the cellulose ether and the borate, phosphate, or other anti-staining salt or they may include plasticizers such as ethylene glycol, glycerol, diethylene glycol, mannitol, sorbitol, diacetin, glycerol borate and the like up to about a quantity equalling the cellulose ether. They may also include film-builders such as dextrose, levulose, sodium silicate, soluble casein, water soluble gums such as gum tragacanth, gum arabic, and the like up to about a quantity equalling the cellulose ether. The compositions may be pigmented or colored, if desired.

Although the present invention is primarily directed to coating compositions having the primary purpose of depositing films, the invention includes in its scope the addition of borate, phosphate or like salts to compositions of water-soluble cellulose ethers intended for use as adhesives. Similarly, the invention includes within its scope the addition of such salts to aqueous solutions in which a cellulose ether is used as a thickening agent. The solutions will contain about 0.3% to about 3% cellulose ether when used as a thickener and from about 1% to about 20% cellulose ether in coating and adhesive compositions.

The water-soluble cellulose ether hereinbefore referred to may be methyl cellulose, ethyl cellulose, the cellulose ether of glycollic acid, a water-soluble salt of the cellulose ether of glycollic acid, hydroxyethyl cellulose, or other like lower alkyl ethers with simple or substituted alkyl groups. It will be understood that in each case the substitution of the cellulose is in the range in which the ether is soluble in water. The water solubility may be in hot water or in cold water and will, in most cases, be such that the ether is readily soluble in cold water and is insoluble and indifferently soluble in warm water.

The manner in which the salts utilized function is not known but is believed to involve inactivation of metal ions first formed by the coating solution on contact. The action is not due to mild alkalinity alone since calcium hydroxide, ammonium hydroxide and common organic amines do not function in a like manner in cellulose ether water solutions.

The compositions according to the present invention permit application of cellulose ether water paints or like coatings to be used on iron surfaces or close to iron such as nails and the like without the formation of iron stains or destruction of film continuity by immediate rust formation. The compositions are impervious to greases and oils.

What I claim and desire to protect by Letters Patent is:

1. Aqueous composition suitable for coating, comprising in water solution from about 0.3% to about 20% of a water-soluble cellulose ether and a quantity of a water-soluble alkaline-reacting salt of a polybasic acid 0.1–5% of the solution, but less than 12% of nonvolatile components of the solution, to permit formation of continuous films therefrom, to prevent staining and to prevent failure of deposited coatings due to iron rust, without substantial embrittlement of deposited films.

2. An aqueous composition suitable for coating, comprising in water solution from about 0.3% to about 20% of a water-soluble methyl cellulose and a quantity of a water-soluble alkaline-reacting salt of a polybasic acid 0.1–5% of the solution, but less than 12% of nonvolatile components of the solution, to permit formation of continuous films therefrom, to prevent staining and to prevent failure of deposited coatings due to iron rust, without substantial embrittlement of deposited films.

3. An aqueous composition suitable for coating, comprising in water solution from about 0.3% to about 20% of a water-soluble cellulose ether and a quantity of a water-soluble alkaline-reacting salt of a phosphoric acid 0.1–5% of the solution, but less than 12% of nonvolatile components of the solution, to permit formation of continuous films therefrom, to prevent staining and to prevent failure of deposited coatings due to iron rust, without substantial embrittlement of deposited films.

4. An aqueous composition suitable for coating, comprising in water solution from about 0.3% to about 20% of a water-soluble cellulose ether and a quantity of a water-soluble alkaline-reacting salt of a boric acid 0.1–5% of the solution, but less than 12% of nonvolatile components of the solution, to permit formation of continuous films therefrom, to prevent staining and to prevent failure of deposited coatings due to iron rust, without substantial embrittlement of deposited films.

5. An aqueous composition suitable for coating, comprising in water solution from about 0.3% to about 20% of a water-soluble cellulose ether and a quantity of trisodium phosphate 0.1–5% of the solution, but less than 12% of nonvolatile components of the solution, to permit formation of continuous films therefrom, to prevent staining and to prevent failure of deposited coatings due to iron rust, without substantial embrittlement of deposited films.

6. An aqueous composition suitable for coating, comprising in water solution from about 0.3% to about 20% of a water-soluble cellulose ether and a quantity of sodium tetraborate 0.1-5% of the solution, but less than 12% of nonvolatile components of the solution, to permit formation of continuous films therefrom, to prevent staining and to prevent failure of deposited coatings due to iron rust, without substantial embrittlement of deposited films.

7. An aqueous composition suitable for coating, comprising in water solution from about 0.3% to about 20% of a water-soluble methyl cellulose and a quantity of sodium tetraborate 0.1-5% of the solution, but less than 12% of nonvolatile components of the solution, to permit formation of continuous films therefrom, to prevent staining and to prevent failure of deposited coatings due to iron rust, without substantial embrittlement of deposited films.

8. An aqueous composition suitable for coating, comprising in water solution from about 0.3% to about 20% of a water-soluble methyl cellulose and a quantity of trisodium phosphate 0.1-5% of the solution, but less than 12% of nonvolatile components of the solution, to permit formation of continuous films therefrom, to prevent staining and to prevent failure of deposited coatings due to iron rust, without substantial embrittlement of deposited films.

9. An aqueous composition suitable for coating, comprising in water solution from about 0.3% to about 20% of a water-soluble cellulose ether and a quantity of an alkali metal borophosphate above 0.1% of the solution and 10% to 40% by weight of the cellulose ether in the solution, to permit formation of continuous films therefrom, to prevent staining and to prevent failure of deposited coatings due to iron rust, without substantial embrittlement of deposited films.

10. An aqueous composition suitable for coating, comprising in water solution from about 0.3% to about 20% of a water-soluble methyl cellulose ether and a quantity of an alkali metal borophosphate above 0.1% of the solution and 10% to 40% by weight of the cellulose ether in the solution, to permit formation of continuous films therefrom, to prevent staining and to prevent failure of deposited coatings due to iron rust, without substantial embrittlement of deposited films.

11. An aqueous composition suitable for coating, comprising in water solution from about 0.5% to about 20% of a water-soluble methyl cellulose and a quantity of a sodium borophosphate above about 0.1% of the solution and about 10% to about 100% of the methyl cellulose in the solution, to permit formation of continuous films therefrom, to prevent staining and to prevent failure of deposited coatings due to iron rust, without substantial embrittlement of deposited films.

ROBERT C. MEDL, Jr.

CERTIFICATE OF CORRECTION.

Patent No. 2,340,072. January 25, 1944.

ROBERT C. MEDL, JR.

It is hereby certified that error appears in the printed specification of the above numbered patent requiring correction as follows: Page 1, in the table, third item thereof, for "Cellulose ether of sodium glycollate" read --Cellulose ether of sodium glycollate (low viscosity)--; same item, under column 14, insert the numeral --3--; column 15, for "3" read --4--; and column 16, strike out "4"; and that the said Letters Patent should be read with this correction therein that the same may conform to the record of the case in the Patent Office.

Signed and sealed this 28th day of March, A. D. 1944.

Leslie Frazer (Seal) Acting Commissioner of Patents.